United States Patent [19]

Conrad et al.

[11] 4,355,865
[45] Oct. 26, 1982

[54] LAMINATED OPTICAL FIBER CABLE

[75] Inventors: Lee R. Conrad, Lewisberry; Edward C. Dowling, Sr., Harrisburg, both of Pa.

[73] Assignee: AMP Incorporated, Harrisburg, Pa.

[21] Appl. No.: 132,436

[22] Filed: Mar. 21, 1980

[51] Int. Cl.³ .................................. G02B 5/16
[52] U.S. Cl. .................. 350/96.23; 156/300; 156/303.1
[58] Field of Search .......... 350/96.23; 156/179, 156/297, 300, 303.1, 301

[56] References Cited

U.S. PATENT DOCUMENTS

| 3,865,466 | 2/1975 | Slaughter | 350/96.23 |
| 3,887,265 | 6/1975 | Margolis et al. | 350/96.23 |
| 4,054,365 | 10/1977 | Marx et al. | 350/96.23 |
| 4,089,585 | 5/1978 | Slaughter et al. | 350/96.23 |
| 4,138,193 | 2/1979 | Olszewski | 350/96.23 |
| 4,176,910 | 12/1979 | Noethe | 350/96.23 |
| 4,185,887 | 1/1980 | Ferrentino | 350/96.23 |
| 4,190,319 | 2/1980 | Eggleston | 350/96.23 |

FOREIGN PATENT DOCUMENTS 2274123 1/1976 France ...................... 350/96.23

Primary Examiner—John D. Lee
Assistant Examiner—Frank Gonzalez
Attorney, Agent, or Firm—Adrian J. LaRue

[57] ABSTRACT

A laminated fiber optic ribbon cable, and method of manufacturing same, is disclosed. The cable comprises top and bottom sheath layers, at least two elongate reinforcement members each located along respective sides of the bottom sheath layer, and a plurality of spaced apart and parallel waveguides positioned upon the bottom sheath layer between the two reinforcement members. Subsequent to the introduction of insulary filler material between the sheath layers, longitudinal edge portions of the sheath layers are bonded together at each side of the cable, with longitudinal gaps being thereby defined along each side of the cable between the bonded sheath edge portions and the two cable reinforcement members. Preparation of the cable for termination may thereby be effectuated by cutting into the longitudinal gaps and peeling back the top sheath layer to access the waveguides and strength members therebeneath.

5 Claims, 9 Drawing Figures

LAMINATED OPTICAL FIBER CABLE

BACKGROUND OF THE INVENTION

1. The Field of the Invention

The present invention relates broadly to flat fiber optic ribbon cable. Specifically, the invention relates to laminated fiber optic ribbon cable, and a method of manufacturing same, of the type incorporating axial reinforcement members therein for improving structural integrity.

2. The Prior Art

Increased utilization of optical systems for data transmission has been hindered by the nonavailability of an economical optical cable configuration which has mechanical integrity, yet which is readily terminated. In particular, the industry had been in need of a flat fiber optic ribbon configuration having multiple coplanar optical waveguides therein. Because of the fragile nature of optical waveguides, such a cable of necessity must have means for limiting the bend radius of the cable and effectively insulating the light transmitting mediums from externally originating mechanical stress, such as compressive or tensile forces exerted on the cable. Further, any proposed cable design must be amenable to easy end termination. This requirement necessarily implies that the waveguide be preserved on a relatively fixed, and therefore locatable, orientation. Moreover, the waveguides in any such cable must be readily accessible during the termination operation. Finally, the cable must be economical to produce and easy to manufacture, since the cost effectiveness of an optical system vis-a-vis a hardwire system depends in large measure on the cost of the cable employed.

No flat optical waveguide cable has been heretofore achieved which could satisfy all of the above design constraints. One approach, disclosed in U.S. Pat. No. 3,887,265 teaches an optical cable having oversized reinforcement members, and optical bundles, imbedded in an outer sheath and an outer oversheath, in a pre-determined configuration. While this cable configuration works well, it is relatively expensive to produce. Further, it is relatively difficult to terminate the cable since removal of multi-layers of sheathing by a stripping operation is cumbersome and uncertain due to variations in the sheathing thickness. Another cable configuration disclosed in U.S. Pat. No. 4,089,585 teaches reinforcement members embedded within an extruded sheath having a bore therethrough for loosely receiving optical waveguides. Such an extruded construction, however, is also relatively expensive, and a precise location of the waveguides within the bore cannot be guaranteed with a sufficient degree of certainty.

SUMMARY OF THE PRESENT INVENTION

A laminated flat fiber optic ribbon cable, and method of manufacturing same, is disclosed which contemplates precise location of at least two elongated large reinforcement members, and a plurality of smaller optical waveguides upon a bottom one of two sheath layers. A top sheath layer covers the larger dimensioned reinforcement members, and insulary material is provided between the top sheath layer and bottom sheath layer to mechanically cushion the optical waveguides in the cable. Optionally, the present cable may be fabricated having the waveguides freely suspended within the insulary material if desired. The top and bottom sheath layers have longitudinal edge portions bonded together at each side of the cable, with longitudinal gaps being thereby defined along each side of the cable between the bonded sheath edge portions and the two reinforcement members. The cable is prepared for termination upon cutting into the longitudinal gaps and peeling back the top sheath layer to gain access to the waveguides and reinforcement members therebeneath.

Accordingly, it is an object of the present invention to provide a method of manufacturing a laminated optical waveguide cable of the type featured having longitudinal reinforcement members and optical waveguides fixed therein in a pre-determined configuration.

It is a further object of the present invention to provide a laminated optical waveguide cable having coplanar optical waveguides presented in a fixed, readily ascertainable location, or optionally, loosely confined within channels of the cable.

Still further, it is an object of the present invention to provide a laminated optical waveguide cable featured having means for protecting optical waveguides therein from externally originating mechanical stress; and for effectively limiting the bend radius of the cable to further protect the waveguides.

Yet a further object of the present invention is to provide a laminated optical waveguide cable which is economically and readily produced, and which is readily terminated.

These and other objects, which will become apparent to one skilled in the art, are achieved by a preferred embodiment which is described in detail below, and which is illustrated in the accompanying drawings.

BRIEF DESCRIPTION OF THE ACCOMPANYING DRAWINGS

DETAILED DESCRIPTION OF THE PREFERRED EMBODIMENT

Figure 1:
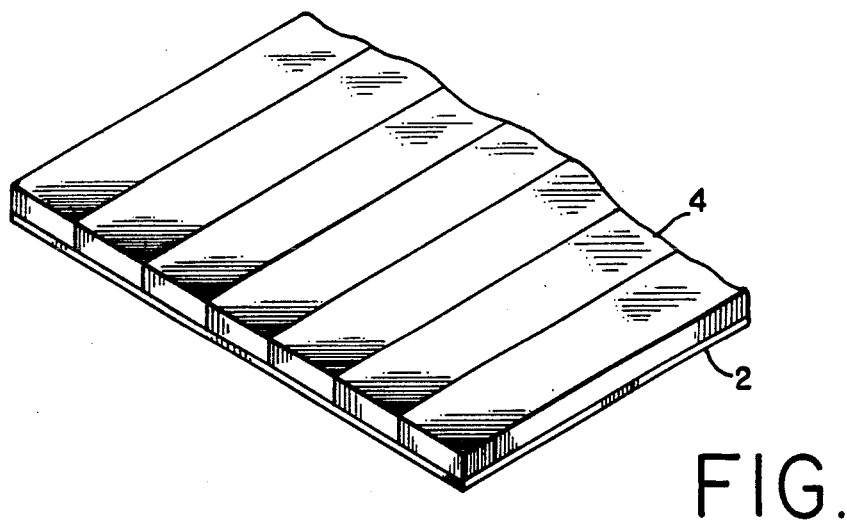
FIG. 1 is a perspective view of the subject cable bottom sheath, having a metallic sheath of material bonded thereto at the beginning of the cable fabrication procedure. Selective longitudinal cuts, as illustrated, have been made into the metallic sheet pursuant to the teachings of the present invention.
Figure 2:
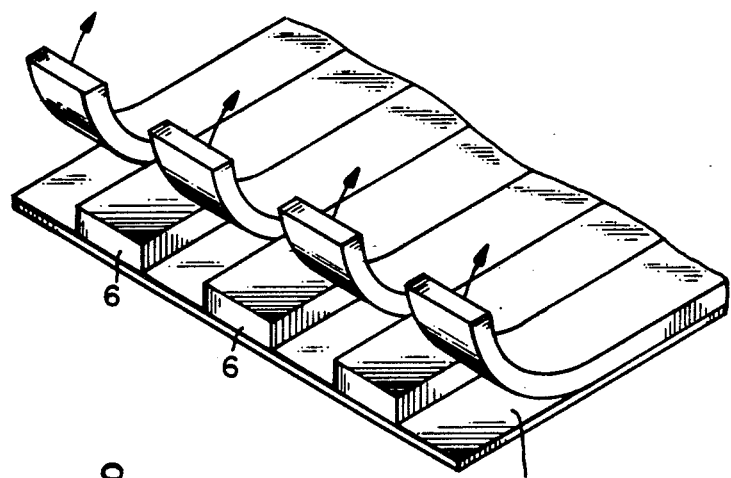
FIG. 2 is a perspective view of the bottom cable sheath and metallic sheet of FIG. 1, with alternate longitudinal sections of the cut metallic sheet peeled away from the bottom sheath layer.
Figure 7:
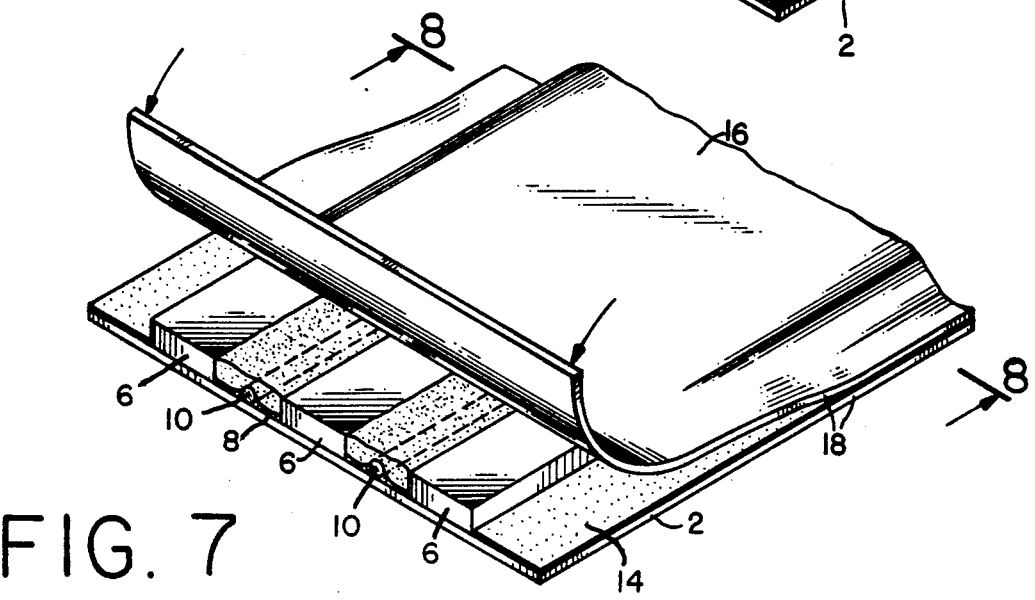
FIG. 7 is a perspective view of the present invention taken in sequence following FIG. 6, and illustrating a top cover sheath positioned over the longitudinal reinforcement strips and the bottom cable sheath.

A method of manufacturing the subject optical waveguide cable proceeds as follows with sequential reference to FIGS. 1 through 7. Referring first to FIG. 1, a base sheath layer 2, preferably formed of a polyester material (Mylar), is adapted having a metallic sheet 4 of tin plated copper bonded thereto. While such materials are preferred, other materials which are substitutable and which will be apparent to one skilled in the art are intended to be within the contemplation of the present invention.

Longitudinal cuts are made through the metallic sheet along the axial length of the cable, and thereby define a plurality of elongate reinforcement strips 6 across the base sheath layer 2. Alternate ones of the reinforcement strips 6 (FIG. 2), are thereafter peeled back and removed, with a plurality of strips thereby remaining across the base sheath layer 2 in a spaced apart parallel configuration. It is intended that the outer reinforcement strips upon the bottom sheath layer 2 be removed to thereby expose an outer edge portion of the base sheath layer for the purpose explained in detail below.

Figure 3:
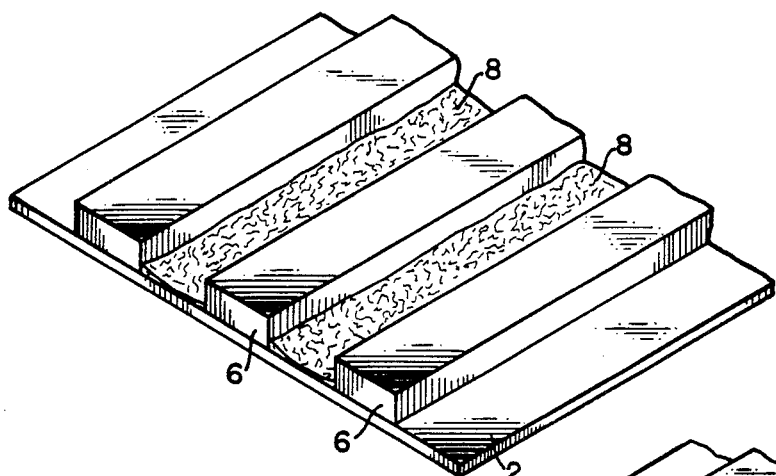
FIG. 3 is a perspective view of the subject cable bottom sheath and metallic reinforcement members bonded thereto, in sequence with FIGS. 1 and 2. Additional bonding material has been introduced between the longitudinal reinforcement strips pursuant to the teachings of the present invention.
Figure 4:
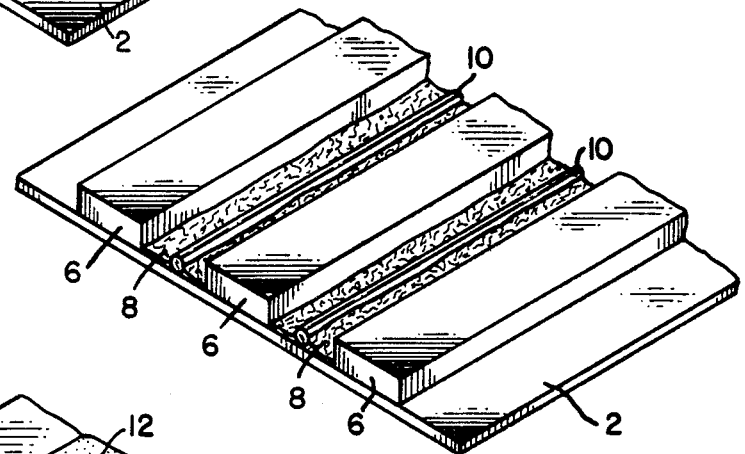
FIG. 4 is a perspective view taken in sequence with FIGS. 1, 2, and 3, with elongate optical waveguides positioned between the longitudinal reinforcement strips.
Figure 5:
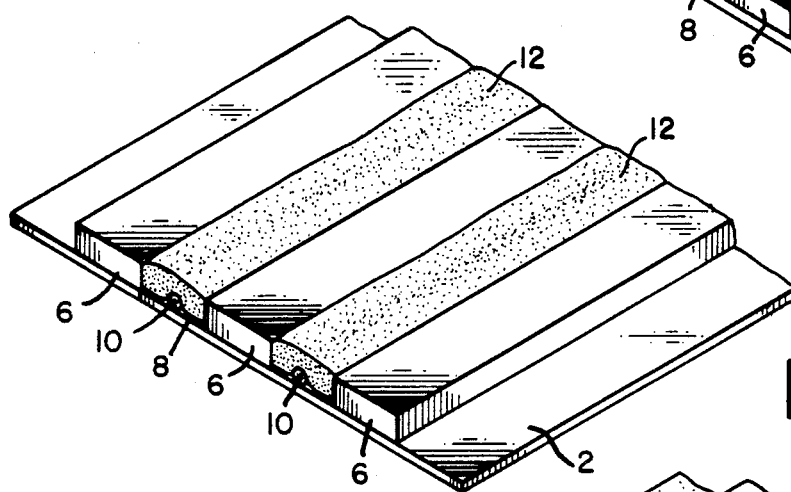
FIG. 5 is a perspective view taken in sequence following FIG. 4, with layers of insulary material positioned between the longitudinal reinforcement strips and over the elongate optical waveguides.

Proceeding with the manufacture of the present invention, and with reference to FIG. 3, a layer of adhesive 8 (e.g. epoxy) is introduced between the elongate reinforcement strips 6 and upon the base sheath layer 2. Thereafter, (FIG. 4), optical waveguides 10, composed of either glass or plastic light transmitting material, are situated between the longitudinal reinforcement strips 6 and upon the base sheath layer 2. The epoxy adhesive 8 is permitted to cure to thereby fixedly locate the optical waveguides 10 and 8 in permanent location upon the bottom sheath layer 2. Continuing, as shown in FIG. 4, an insulary material 12 is then introduced between the longitudinal strips 6 and over the optical waveguides 10. The insulary material 12, can constitute any one of a number of foam materials, e.g., a silicon foam filler.

Figure 6:
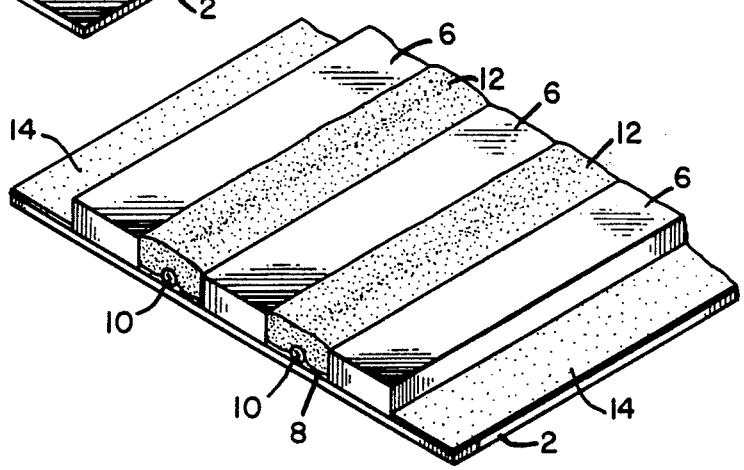
FIG. 6 is a perspective view taken in sequence following FIG. 5 in the manufacture of the cable, illustrating the introduction of adhesive material along the outer edge surfaces of the bottom sheath layer.
Figure 8:
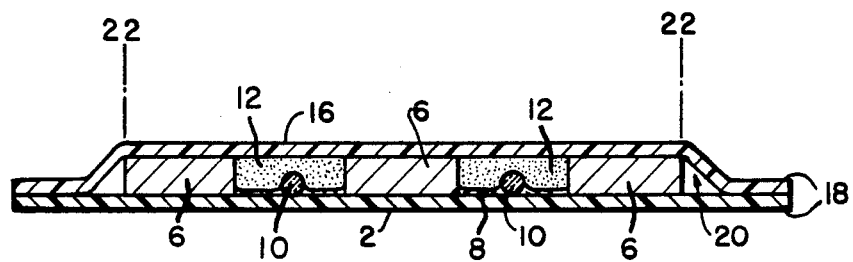
FIG. 8 is a transverse section view of the subject optical waveguide cable, showing the location where cable stripping cuts are to be made.

A layer of epoxy adhesive 14 is applied to the exposed longitudinal edge portions of the bottom sheath layer 2 as illustrated in FIG. 6. Thereafter (FIG. 7) a strippable top cover 16, formed of a polyester material such as Mylar, is applied to the top of the base sheath layer 2 in a progressive fashion. The top cover 16 and the base sheath layer 2 are attached together by clamping pressure upon the epoxied edge portions 18. As best shown by the transverse sectional view through the cable illustrated by FIG. 8, between the longitudinal reinforcement strips 6 and the edge portions 18 of the base sheath layer 2 and the top cover 16 are longitudinal edge gaps 20 which extend along the edge of the cable the length thereof. The longitudinal edge gaps 20 facilitate convenient preparation of the cable for end termination according to the following procedure. Since the top sheath cover 16 and the base sheath layer 2 are attached only at the edge portion 18, by making longitudinal cuts 22 through the top sheath layer and into the longitudinal edge gaps 20, the top sheath layer can be severed from the bottom sheath layer and peeled back an appropriate length in order to expose the tops of the reinforcement strips 6, and to provide access to the optical waveguides 10.

It will be appreciated from the foregoing that location of the reinforcement strips 6 and the optical waveguides therebetween which are preserved in a predetermined location across the base sheath layer 2, can be ascertained with a high degree of certainty, which greatly enhances the terminatability of the cable. Further, the elongate reinforcement strips 6 serve to structurally reinforce the cable geometry, and resiliently resist any overbending of the cable which would damage the optical waveguides. The strength members further absorb impact on the cable, and function to control the bend radius of the cable to ensure that overbending cannot occur. Moreover, if the elongate reinforcement strips 6 are of metallic composition, though they need not necessarily be, they can fulfill the additional function of bussing power along the cable to remote electro-optic electronic circuitry.

Figure 9:
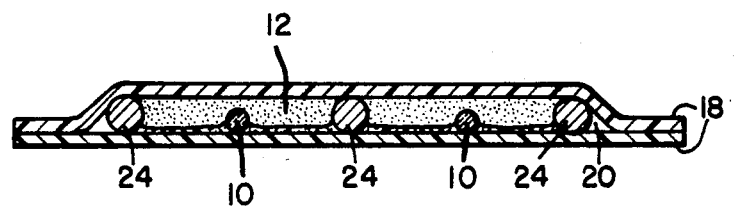
FIG. 9 is a transverse section through an alternative embodiment of the subject invention, illustrating an alternative cable embodiment having longitudinal reinforcement members of a circular transverse section.

An alternative embodiment of the present invention is illustrated in FIG. 9. As shown, the elongate reinforcement members 24 can be of circular cross section if so desired by the user. In all other respects, the cable may be fabricated and formed in the sequential operation described in detail above. It is also within the contemplation of the present invention that the strength members 24 of FIG. 9 or 6 of FIG. 3 may be composed of dielectric material if metallic members are neither needed nor desired by the cable user. Moreover, the manufacture of the subject laminated cable may be modified by those skilled in the art without departing from the scope of the present invention. For example, the strength members may be rolled onto the bottom sheath layer instead of deposited thereon by the above described cut and peel procedure. Also, while the above set forth cable embodiments envision securely affixing the waveguides upon the bottom sheath layer, it will be appreciated that the waveguides may be free floating in the filling gel if so desired. Such a free float condition would be advantageous if fixed location of the waveguides is not deemed critical, since the waveguides would thereby be entirely surrounded by insulary fill and therefore optimally protected.

The present invention may be subject to many modifications without departing from the spirit of essential characteristics thereof. The present embodiment should therefore be considered as illustrative and not restrictive of the scope of the subject invention.

What is claimed is:

1. A fiber optic ribbon cable comprising:
   bottom sheath means;
   a plurality of strength member means spaced from one another and extending along said bottom sheath means;
   optic waveguide means disposed between the spaced strength member means and extending along said bottom sheath means;
   means bonding said strength member means in fixed positions on said bottom sheath means;
   means adhesively securing said optic waveguide means on said bottom sheath means between the spaced strength member means;
   insulary material filler means covering said optic waveguide means between said strength member means; and
   top sheath means extending along said strength member means and said insulary material filler means with edge portions of said sheath means bonded together.

2. A fiber optic ribbon cable as set forth in claim 1, wherein said insulary material filler means comprises a silicone foam.

3. A fiber optic ribbon cable as set forth in claim 1, wherein each said strength member has a flat rectangular sectioned profile.

4. A method of forming a laminated fiber optic cable, comprising the steps of:
- bonding a sheet of material means to a bottom sheath layer;
- cutting said sheet in axial strips along said bottom sheath layer;
- peeling off said strips leaving at least two strips on said bottom sheath layer as strength members spaced a distance from respective sides of said bottom sheath layer;
- positioning optic waveguides between said strength members in mutually parallel spaced apart relation;
- covering said strength members with a top sheath layer so that each said strength member is likewise located a distance from a respective side of top sheath layer; and
- bonding edge portions of said sheath layers together.

5. A method as set forth in claim 4, including the step of filling the space between said strength members and covering said waveguides with insulary material means prior to covering said strength members with said top sheath layer.

* * * * *